United States Patent [19]

Enokimoto

[11] Patent Number: 5,251,713

[45] Date of Patent: Oct. 12, 1993

[54] FOUR WHEEL VEHICLE

[75] Inventor: Akio Enokimoto, Rancho Palos Verdes, Calif.

[73] Assignee: Honda Giken Kogyo Kabushiki Kaisha, Tokyo, Japan

[21] Appl. No.: 410,172

[22] Filed: Sep. 20, 1989

[51] Int. Cl.$^5$ .............................................. B60K 11/04
[52] U.S. Cl. ................................... 180/68.4; 224/309
[58] Field of Search ............... 180/68.4, 908, 68.1; 280/756; 296/185, 186; 224/42.45 R, 309

[56] References Cited

U.S. PATENT DOCUMENTS

| | | | |
|---|---|---|---|
| 3,203,604 | 8/1965 | Spence | 224/309 |
| 4,553,783 | 11/1985 | Lagana | 280/756 X |
| 4,696,361 | 9/1987 | Clark et al. | 180/68.4 |
| 4,815,550 | 3/1989 | Mather et al. | 180/68.4 X |
| 4,828,017 | 5/1989 | Watanabe et al. | 180/68.4 X |

OTHER PUBLICATIONS

"The Lightweights", *Hot Rod*, Mar. 1969, Bandido on p. 37.

*Primary Examiner*—Margaret A. Focarino
*Assistant Examiner*—Michael Mar
*Attorney, Agent, or Firm*—Lyon & Lyon

[57] ABSTRACT

A vehicle having a support structure suspended on four wheels. Two seats are located centrally in the vehicle with an engine mounted rearwardly thereof. A radiator is mounted behind and higher than the engine and the seat backs are spaced apart such that an open passage allows flow between the seat backs, over the engine and to the radiator. A carrier rack is positioned above the open passage so as not to interfere with the flow therethrough. A steering assembly includes a tilt mechanism to allow movement of the steering wheel upwardly for improved access to the driver seat. A grab bar extends laterally from the tiltable portion of the steering structure such that it too will tilt upwardly with the tilt mechanism. The grab bar extends laterally to before the passenger seat for use by the passenger in rough terrain. In a second vehicle, a body having a top with recessed ports therein and columns extending rearwardly and downwardly from the top to the main body includes conduits from the ports through the columns to an air cleaner associated with the rear mounted engine. The cockpit remains open beneath the top to receive air flow directed to the radiator. Forwardly on the body, a floor is provided in the cockpit with an upwardly extending wall at the front end thereof. A vertical body panel extends rearwardly from the wall to bisect the forward portion of the cockpit into two footwells. Forwardly of the wall is a compartment for storage.

10 Claims, 6 Drawing Sheets

FOUR WHEEL VEHICLE

BACKGROUND OF THE INVENTION

The field of the present invention is four wheel, off road vehicles.

Off road recreational vehicles commonly referred to as dune buggies have typically employed a frame structure, four wheels, one or two seats and a rear mounted engine. Such vehicles are found both with and without a body on the frame or with separate panels attached to the frame at strategic positions. Traditionally, the engines have been air cooled and are mounted directly over or even slightly behind the rear wheels. Such vehicles are typically rear wheel drive. Either one or two seater configurations typically have the seats placed forwardly of the engine in some form of structural frame to provide for protection during vehicle rollovers. Because of the contemplated use, dune buggy designs have typically attempted to provide some protection for the vehicle components from obstacles for which there may be insufficient ground clearance and from airborne mud, rocks and foliage.

Air cooling for engines in many vehicle designs have been replaced by water cooling systems. Water cooling offers a variety of advantages over air cooled designs, but also has certain disadvantages. Water cooling systems require the addition of a radiator. Radiators require relatively unrestricted air flow thereto and also are prone to being damaged or clogged. Thus, in designing off road recreational vehicles having water cooled engines, particular attention must be directed to location and protection of the water cooling system.

Attention must also be directed to protection of the air intake to the engine. In this instance it is not the air intake itself which is likely to be damaged but the likelihood of drawing damaging materials into the engine through the air intake. Typical solutions have resulted in the employment of air ducts running from air filters mounted high on the vehicle frame, often the portion of the frame associated with the cockpit or roll cage, to the engine.

SUMMARY OF THE INVENTION

The present invention is directed to off road vehicle structural and component arrangements.

In a first aspect of the present invention to accommodate a water cooled engine design, the present invention contemplates advantageous radiator placement on an off road vehicle having an open cockpit with seats mounted forwardly of an engine. Placement of the radiator near the back of the engine and extending to higher than the engine provides protection for the radiator against substantially all of the hazards which are reasonably expected to be encountered through use of such a vehicle. Additionally, air flow to the radiator may be enhanced through the preservation of an air path forwardly thereof. For example, space between the seat backs may be employed to ensure air flow through the vehicle to the rearwardly mounted radiator. Such an arrangement can also accommodate a carrier rack above the contemplated air passage and an advantageous fuel tank placement in front of the engine but below the contemplated air passage.

In a second aspect of the present invention, ingress and egress of the vehicle occupants are addressed. Off road vehicles typically are designed to be light and yet exhibit substantial strength necessary to accommodate the contemplated rough use. Many designs compromise some convenience in access to the passenger area so as to provide a stronger and lighter frame. To accommodate both the driver and a passenger, a tilt steering wheel is contemplated with a grip bar extending laterally from the tiltable steering column to a location before the passenger seat. When the steering wheel is tilted upwardly, the grip bar also moves forwardly and upwardly. Thus, tilting the steering wheel provides improved access for both the driver and the passenger. Once the occupants are positioned, the wheel may be tilted down for proper operation and to bring the passenger grip bar into appropriate placement as well.

In a further aspect of the present invention, an off road vehicle is contemplated to employ a top above the cockpit which contains one or more ports built into the top. The top is supported by four corner supports which may be part of the frame. The port may be connected to the engine inlet by means of a conduit extending therefrom down one or both of the rear supports to the engine. An air filter may be associated with the port and/or an air cleaner may be provided at the engine. The port or ports may be recessed into the top in such a way as to provide for smooth flow thereto and yet avoid increased drag and turbulence.

In another aspect of the present invention, additional protection is contemplated through the arrangement of the frame. The wheels and tires of such vehicles themselves provide protection for the vehicle in rough terrain. At the same time, it is advantageous to protect the suspension systems associated with each wheel. Protection may be afforded to the frame by having the widest portion of the frame between the front and rear wheels be narrower than the outside track of the front wheels, i.e., narrower than the width of the front wheels measured at their outer surfaces. Protection for the rear suspension system is enhanced by having the maximum width of the frame between the front and rear wheels being wider than the inside track of the rear wheels, i.e., wider than the distance between the inside surfaces of the wheels. Naturally, this arrangement contemplates a vehicle wherein the inside track of the rear wheels is no greater than the outside track of the front wheels.

In yet another aspect of the present invention, attention is directed to the cockpit where a wall is provided forwardly of the seat occupied by the nondriving passenger. As part of the body, this wall may include a rearwardly extending vertical panel and a storage compartment forwardly of the wall. The storage compartment has obvious utility while the vertical panel can divide the otherwise open area to prevent the lower extremities of the nondriving passenger from interfering with the vehicle pedal operations in rough terrain.

Accordingly, it is an object of the present invention to provide an improved off road vehicle. Other and further objects and advantages will appear hereinafter.

DETAILED DESCRIPTION OF THE PREFERRED EMBODIMENT

Figure 1:
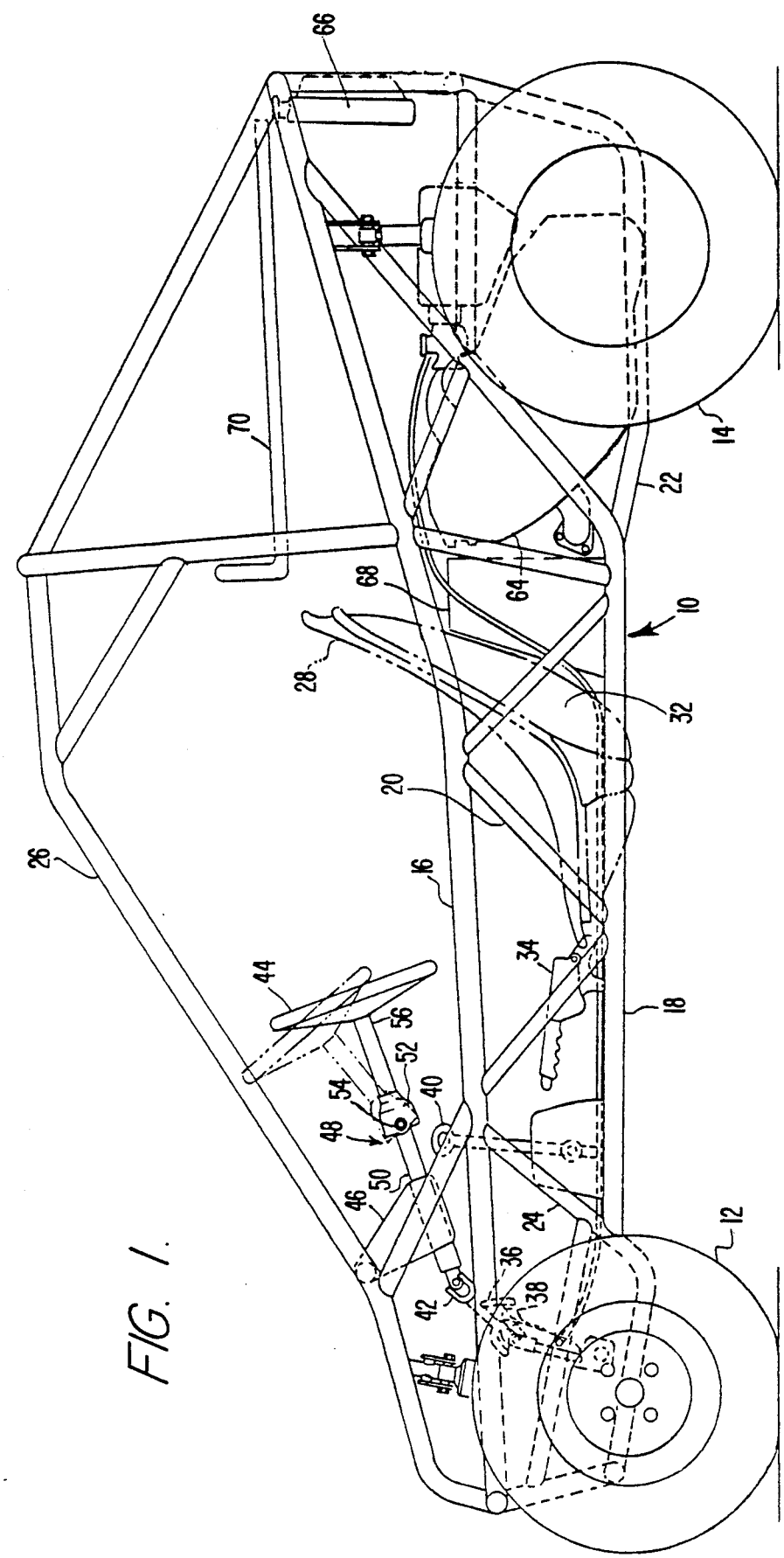
FIG. 1 is a side view of a device of the present invention.

Turning in detail to the drawings, a four wheel vehicle is illustrated having a frame structure, generally designated 10, two front wheels 12 and two rear wheels 14. The frame structure 10 is symmetrical about a center plane of the vehicle and has a truss on either side of the vehicle defined by main frame tubes 16 and 18 with struts 20 extending therebetween. Rearwardly of the main frame tubes 18 are rear mounting elements 22. Front mounting elements 24 are located at the front of the vehicle. The frame also extends upwardly to define a cage 26 surrounding the cockpit and also the upper portions of the front and rear of the vehicle. The wheels 12 and 14 are suspended from the frame structure 10. The vehicle is generally open bodied particularly upwardly of the frame truss.

Figure 2:
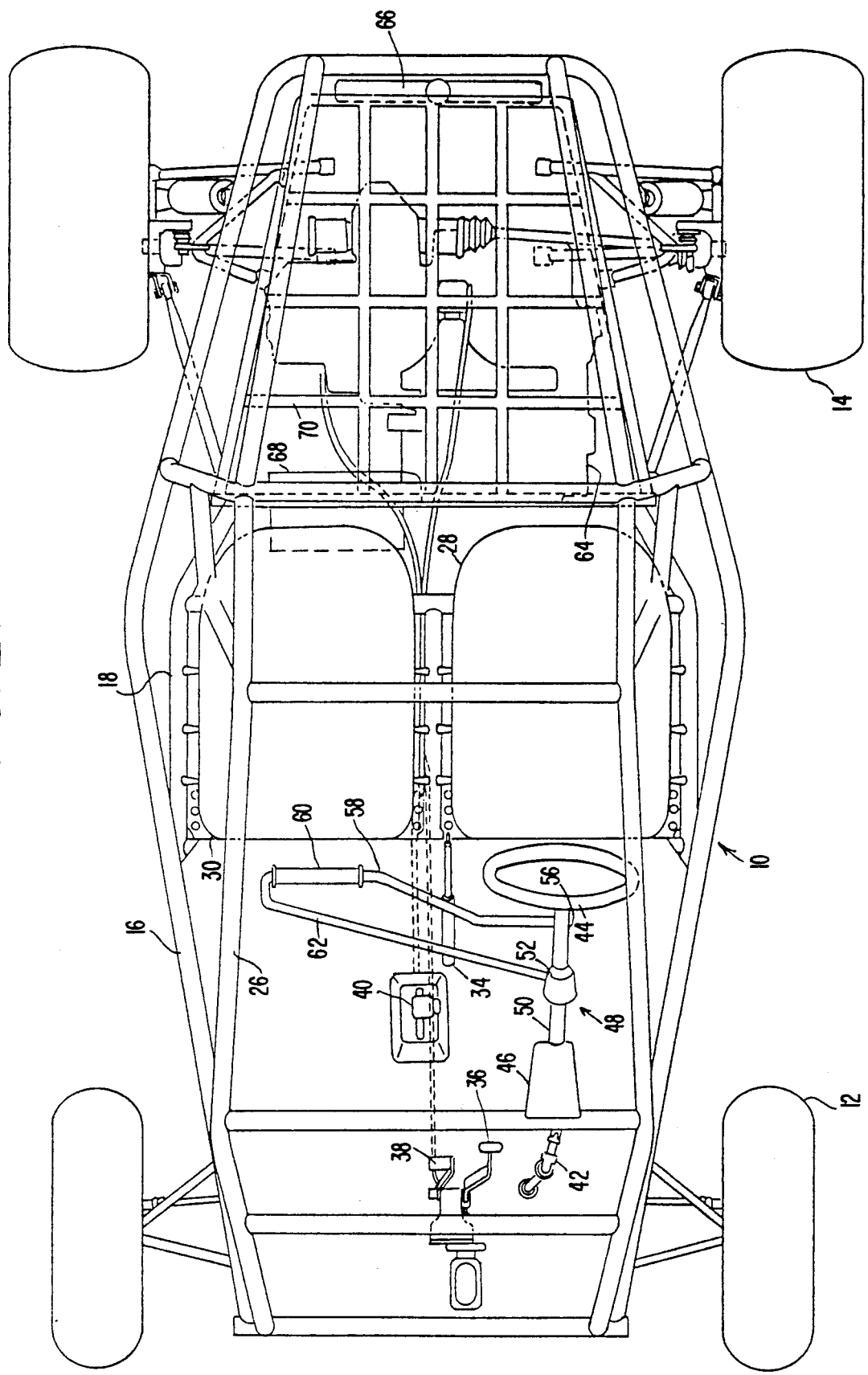
FIG. 2 is a plan view of the device of FIG. 1.

The frame 10, as shown from above in FIG. 2, has a maximum width between the front and rear wheels. This maximum width of the frame 10 is shown to be about the cockpit for additional room and protection to the cockpit area. The width of the frame in this location is shown to be less than the outside track of the front wheels. The outside track is measured between the outermost portions of the wheels and tires of the front wheels 12. In this way, the front wheels are most likely to encounter or be directed by the operator to avoid brush and terrain before encountering the frame. With the frame narrower than the outside front track, the likelihood of impact against the frame is lessened. The rear wheels are arranged relative to the frame such that the inside rear track as measured from the inner sides of the wheels and tires is narrower than the frame 10 at its widest point. In this way, when brush, debris and terrain do intrude inwardly of the front track due either to lateral movement of the vehicle or resiliency of the brush and debris, the frame is more likely to be impacted than the suspension system supporting either rear wheel 14.

Figure 3:
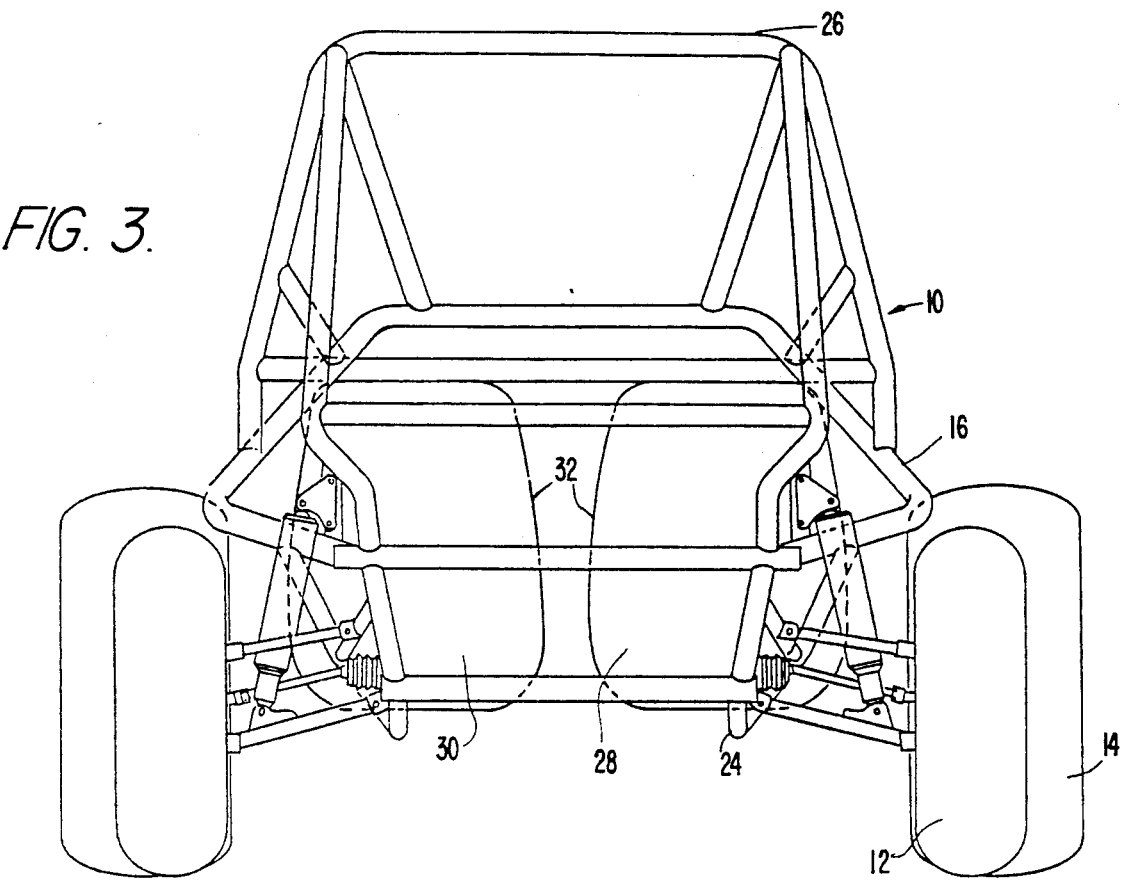
FIG. 3 is a front view of the device of FIG. 1.
Figure 4:
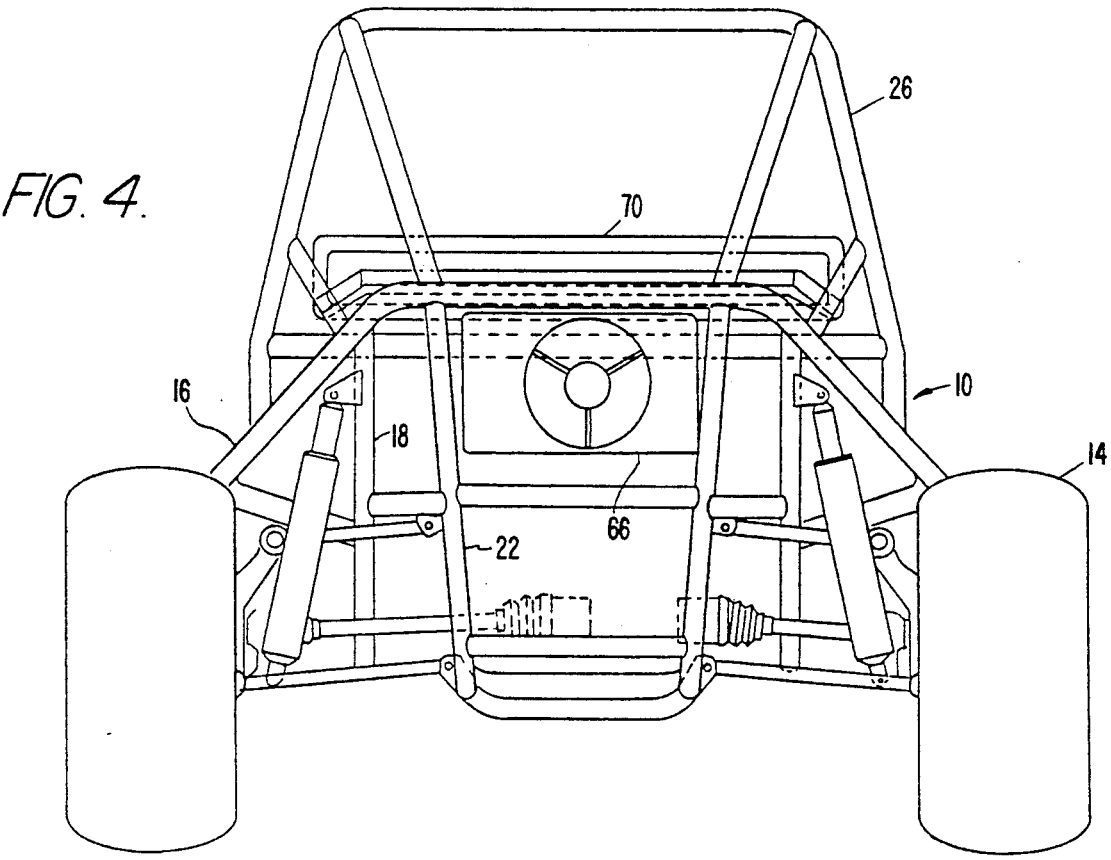
FIG. 4 is a back view of the device of FIG. 1.
Figure 5:
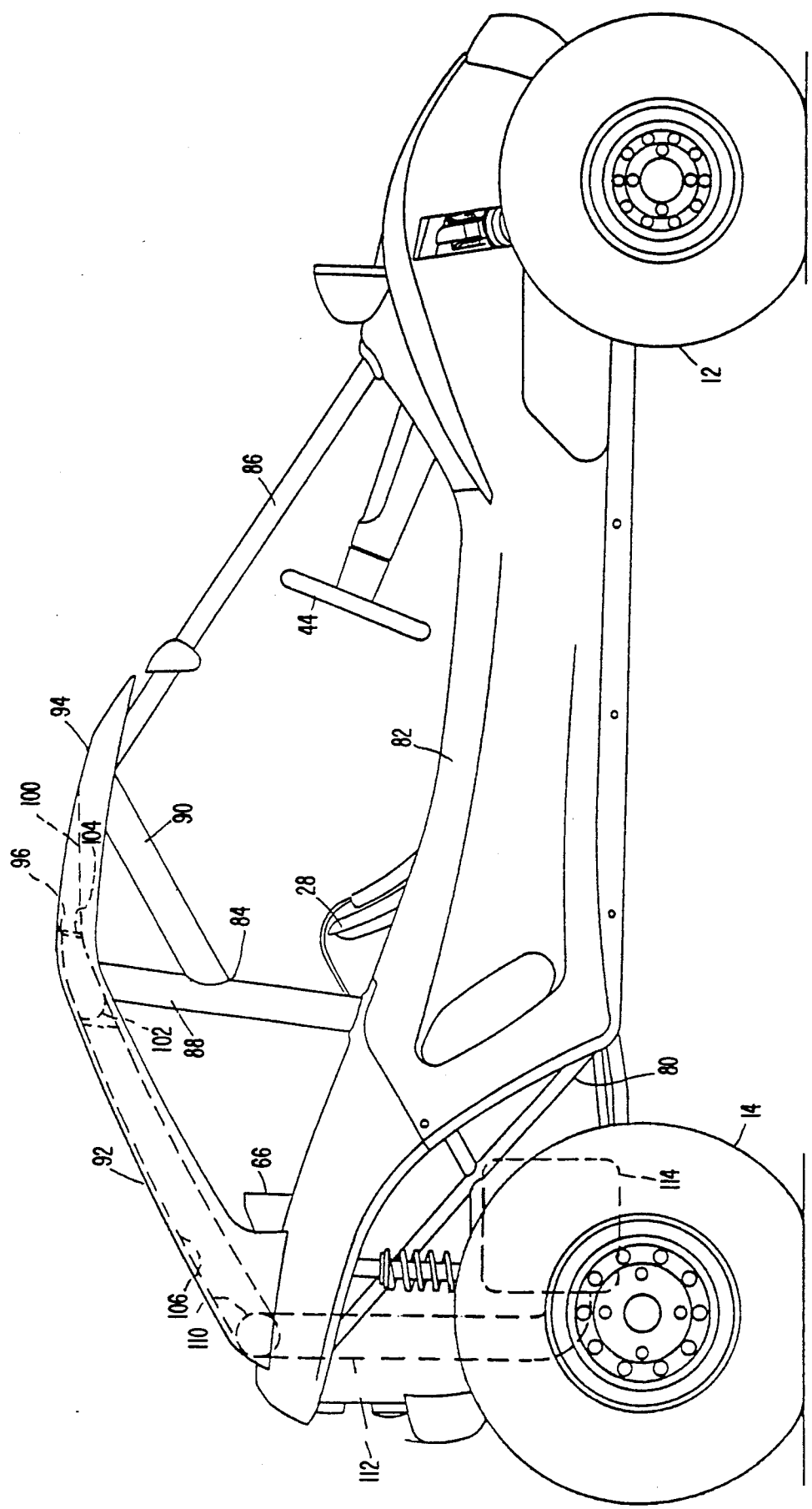
FIG. 5 is a side view of a second device of the present invention.
Figure 6:
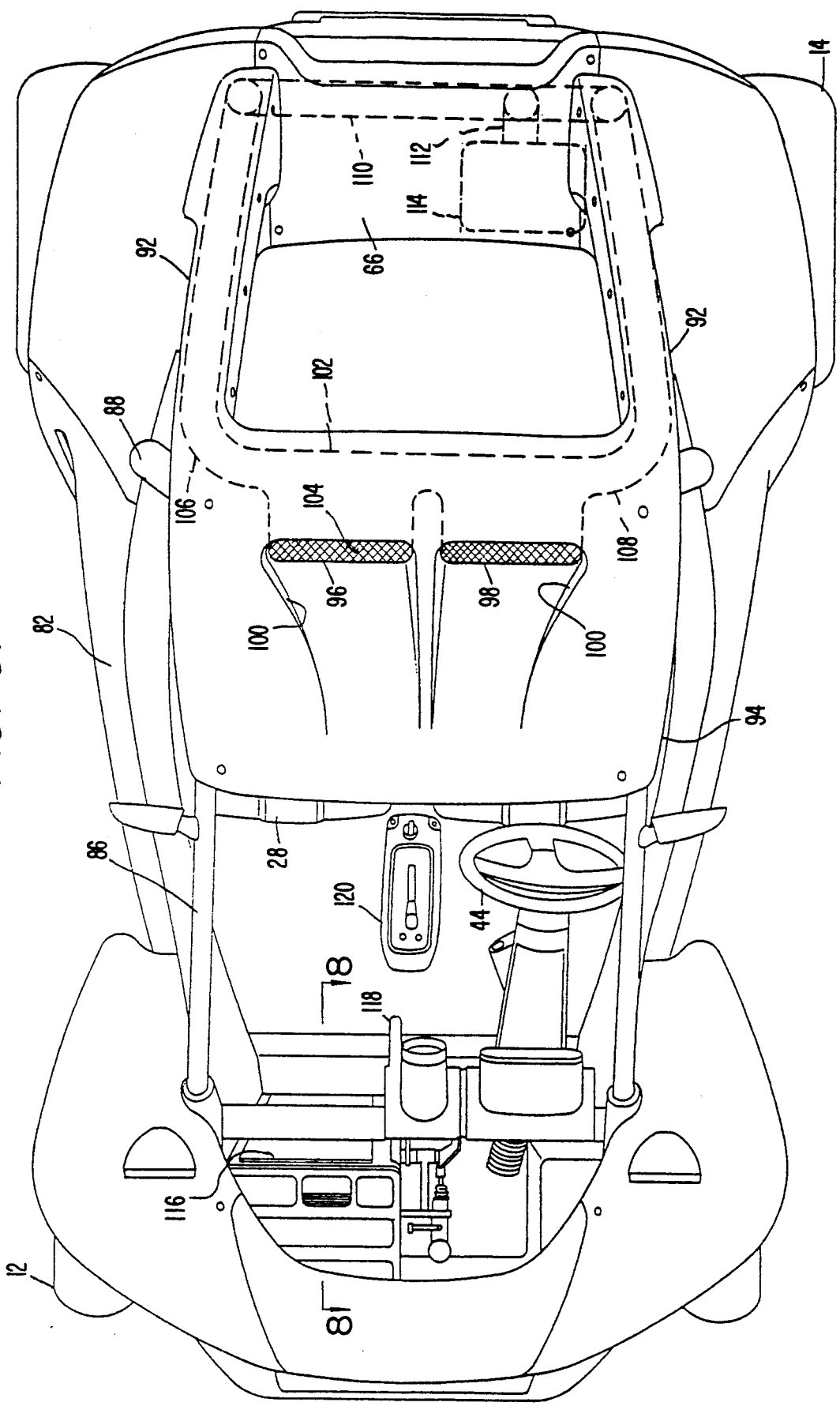
FIG. 6 is a plan view of the device of FIG. 5.
Figure 7:
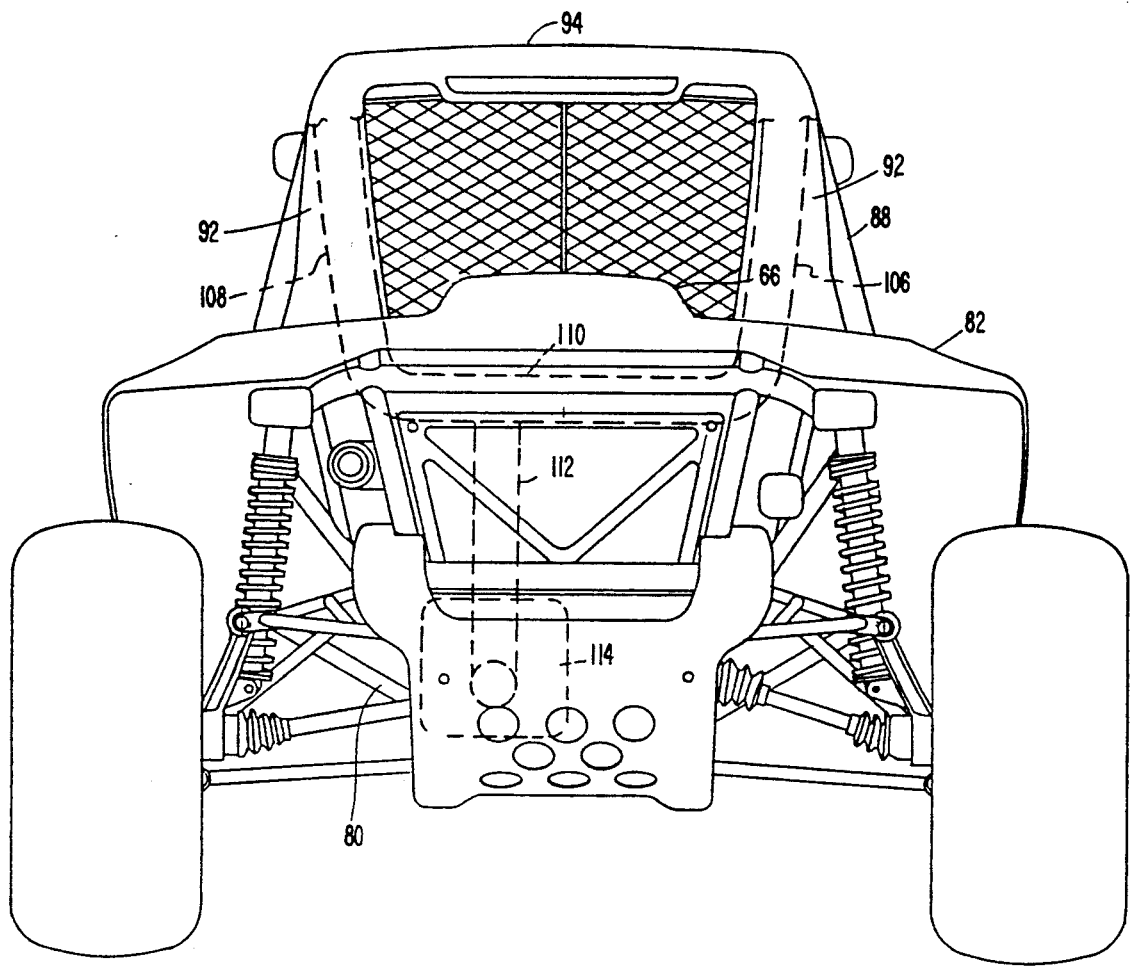
FIG. 7 is a back view of the device of FIG. 5.
Figure 8:
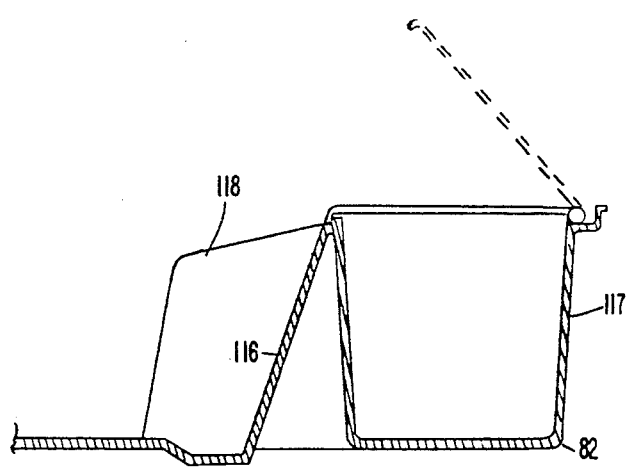
FIG. 8 is a sectional view taken along line 8—8 of FIG. 6.

Located centrally within the frame structure 10 and specifically inwardly of the cage 26 are two seats 28 and 30. In this embodiment, the seat 28 on the left side of the vehicle is the driver seat while the seat 30 is the passenger seat. Each of the seats 28 and 30 includes a seat back 32. It can be seen in FIG. 3 that the seat backs 32 are mutually spaced apart. Positioned at conventional locations are a hand brake 34, a foot brake 36, a throttle 38 and a gear shift 40.

Positioned before the driver seat 28 is a steering assembly. The steering assembly includes an articulated steering shaft 42 coupled at a first end to steering linkage and having a steering wheel 44 fixed to the other end. A frame bracket 46 fixed to the cage 26 of the frame structure 10 mounts a steering shaft housing, generally designated 48. The steering shaft housing includes a first portion 50 which is fixed in place by the frame bracket 46. The steering shaft housing 48 surrounds and rotatably mounts the articulated steering shaft 42 therein. The first portion 50 also mounts a tilt mechanism 52. The tilt mechanism 52 has a pivot axis 54 which is horizontal and also is perpendicular to the longitudinal axis of the first portion 50 of the steering shaft housing 48. Thus, the steering wheel 44 may be tilted upwardly as can best be seen in FIG. 1. Mounted to the tilt mechanism 52 is a second portion 56 of the steering shaft housing 48. Again, the articulated steering shaft extends through and is rotatably mounted within the second portion 56.

Looking specifically to FIG. 2, a grip bar 58 is shown to be mounted to the second portion 56 and extends laterally on the vehicle to a location before the passenger seat 30. A handle 60 may be of any convenient configuration which may prove advantageous. A straight bar is contemplated in the preferred embodiment. Extending outwardly from the tilt mechanism 52 is a support strut 62. The support strut 62 extends into the grip bar 58 away from the steering assembly so as to provide support against bending. In the preferred embodiment, a single tubular element is shown formed to define the grip bar 58 and support strut 62. Because of the mounting of the grip bar 58 on the tilt mechanism 52 and second portion 56, tilting of the steering wheel 44 upwardly as seen in FIG. 1 will cause the grip bar 58 to also tip upwardly for improved access to the passenger seat 30.

Looking to the rear of the vehicle, an engine 64 is mounted to the frame structure 10 rearwardly of the seats 28 and 30. The engine 64 is coupled through an associated drive train with the rear wheels 14. The engine is water cooled and employs a radiator 66. The radiator 66 is mounted to the frame structure 10 behind and above the engine 64 at the rear of the vehicle. Located in front of the engine and behind the seats is a fuel tank 68. Both the radiator 66 and the fuel tank 68 are arranged such that they are unlikely to encounter road hazards. Further, the radiator 66 is located upwardly above other structures such that it is unlikely to become clogged by mud or impacted by objects thrown from the wheels.

The orientation of the radiator 66 also admits air flow across same with the vehicle in motion. The spaced seat backs 32 and the relative height of the engine 64 provide a open passage for air to flow against the radiator 66. Air easily passes between the seat backs as well as through the open frame, over the engine, to the radiator. A carrier rack 70 is situated in the frame structure 10 such that it also avoids the open passage to the radiator. The carrier rack 70 defines a planar mounting surface which is located roughly parallel to the upper surface of the engine and drive train assembly and spaced upwardly therefrom. It is shown to be above the top of the seat backs 32 and the radiator 66. A grill-like structure is defined by the carrier rack for supporting and tying down items without interfering with the flow to the radiator 66.

Turning to the embodiment of FIGS. 5 through 8, a four wheel vehicle is again illustrated. In addition to a frame 80, a vehicle body 82 is employed. The body 82 is mounted to the frame 80 and generally covers the frame to enclose the vehicle with the exception of the cockpit area. The frame 80 defines a roll cage 84 surrounding the cockpit with two front corner supports 86 and a structural roll bar 88 extending continuously over the top of the cockpit. Forwardly extending roll cage elements 90 further define a protected cage for the vehicle occupants. The front corner supports extend from the lower frame upwardly and rearwardly to meet the roll cage elements 90.

The body 82 extends upwardly in two columns 92 to a top 94. The top 94 is fixed to the roll cage 84 above the cockpit. The upper surface of the top 94 is generally smooth and slightly convex. Located centrally in that surface are two ports 96 and 98 as can best be seen in FIG. 6. The ports 96 and 98 are recessed with streamlined entry channels 100 extending thereto in order that flow over the upper surface of the top 94 will follow the channel surfaces to the ports 96 and 98. Some inertial separation may also occur as heavier material is likely to continue upwardly above the top rather than follow the channels into the ports.

Associated with the top 94 is a collection manifold 102 in communication with the ports 96 and 98. Screens 104 may be positioned and retained in the ports 96 and 98 to assist in elimination of larger particles from the air stream flowing to the engine. Extending rearwardly and downwardly through the columns 92 are conduits 106 and 108. These conduits 106 and 108 are hidden within the columns 92 to avoid the appearance of an air snorkel. Located in the body rearwardly of the engine is a lateral collecting pipe 110 which is in communication with the conduits 106 and 108. An intake passage 112 extends downwardly from the pipe 110 to an air cleaner 114. From the air cleaner 114, air drawn into the ports 96 and 98 and through the manifold 102, the conduits 106 and 108, the pipe 110 and the intake passage 112 is presented to the carburetor intake.

The engine layout, radiator position and other elements may be similarly arranged to that of the first embodiment. The cockpit remains open but for the top 94 which allows air to be drawn through the vehicle to the radiator as disclosed with regard to the first embodiment. In this regard, common reference numerals depict similar components from each embodiment.

In the front of the vehicle, the body is shown to include features not found in the open frame vehicle. A front wall 116 extends upwardly to define the front end of the passenger footwell. Forwardly of that front wall 116 is a compartment 117 having access through an upper lid. The main body cover is cut away to allow for opening of same. Extending rearwardly from the front wall 116 is a vertical body panel 118. The panel 118 substantially bisects the footwell area of the cockpit and extends toward the center consul 120. This device helps to insure that the passenger's lower extremities do not bounce over into the pedal and control area of the vehicle.

Accordingly, novel four wheel off road vehicles have been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A four wheel vehicle having an open cockpit, comprising
  a frame;
  two laterally spaced seats mounted on said frame;
  a seat back associated with each said seat, said seat backs being laterally spaced apart to define an opening therebetween;
  a water-cooled engine mounted on said frame behind said seat backs;
  a radiator mounted on said frame behind said engine and disposed at a location to receive a flow of cooling air unimpeded by said seat backs and said engine, said radiator being disposed above said engine in a region of said vehicle to receive cooling air flow from the space between said seat backs;
  a carrier rack mounted on said frame between said seats and said radiator and above said engine.

2. The vehicle of claim 1 wherein said engine is disposed below the upper extend of said seat backs.

3. The vehicle of claim 1 further comprising a fuel tank mounted on the fame between said engine and said seats and lower than said radiator.

4. The vehicle of claim 1 wherein said radiator is disposed in a region of said vehicle higher than the top of said engine.

5. The vehicle of claim 1 further comprising an open air passage extending from between said seat backs to said radiator and located between said engine and said carrier rack.

6. A four wheel vehicle having an open cockpit, comprising
  a frame;
  two laterally spaced seats mounted on said frame;
  a seat back associated with each said seat, said seat backs being laterally spaced apart to define an opening therebetween;
  a water-cooled engine mounted on said frame behind said seat backs;
  a radiator mounted on said frame behind said engine and disposed at a location to receive a flow of cooling air unimpeded by said seat backs and said engine, said radiator being disposed above said engine in a region of said vehicle to receive cooling air flow from the space between aid seat backs;
  a carrier rack mounted on said frame between said seats and said radiator and above said engine, said carrier rack defining a generally horizontally attending mounting surface which at its rear extent is higher than said radiator.

7. The vehicle of claim 6 wherein said mounting surface at its front extent is higher than said seat backs.

8. The vehicle of claim 1 wherein said engine is disposed below the upper extent of said seat backs.

9. The vehicle of claim 6 wherein said radiator is disposed in a region of said vehicle higher than the top of said engine.

10. A four wheel vehicle having an open cockpit, comprising
  a frame;
  two laterally spaced seats mounted on said frame;
  a seat back associated with each said seat, said seat backs being laterally spaced apart to define an opening therebetween;
  a water-cooled engine mounted on said frame behind said seat backs, said engine being disposed below the upper extent of said seat backs;
  a radiator mounted on said frame behind said engine and disposed at a location to receive a flow of cooling air unimpeded by said seat backs and said engine, said radiator being disposed above said engine in a region of said vehicle to receive cooling air flow from the space between said seat backs, said radiator being disposed in a region of said vehicle higher than the top of said engine;
  a carrier rack mounted on said frame between said seats and said radiator and above, said engine, said carrier rack defining a generally horizontally attending mounting surface which at its rear extent is higher than said radiator.

* * * * *